(12) United States Patent
Novoselov et al.

(10) Patent No.: US 10,338,375 B2
(45) Date of Patent: Jul. 2, 2019

(54) ELECTROWETTING DISPLAY ELEMENT WITH RADIATION FILTER

(71) Applicant: Amazon Technologies, Inc., Seattle, WA (US)

(72) Inventors: Pavel Novoselov, Eindhoven (NL); Anthony John Slack, Lorgues (FR); Henricus Petronella Maria Derckx, Weert (NL); Jozef Elisabeth Aubert, Roermond (NL)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 15/660,244

(22) Filed: Jul. 26, 2017

(65) Prior Publication Data

US 2017/0322412 A1 Nov. 9, 2017

Related U.S. Application Data

(63) Continuation of application No. 14/582,308, filed on Dec. 24, 2014, now Pat. No. 9,726,880.

(51) Int. Cl.
| | |
|---|---|
| *G02B 26/00* | (2006.01) |
| *G02B 26/02* | (2006.01) |
| *G09G 5/00* | (2006.01) |
| *G09G 3/20* | (2006.01) |
| *G09G 3/34* | (2006.01) |

(52) U.S. Cl.
CPC ......... *G02B 26/005* (2013.01); *G09G 3/2092* (2013.01); *G09G 3/348* (2013.01); *G09G 2310/0267* (2013.01)

(58) Field of Classification Search
CPC ..... G02B 26/004; G02B 26/005; G09G 3/348
See application file for complete search history.

(56) References Cited

U.S. PATENT DOCUMENTS

| | | | |
|---|---|---|---|
| 8,319,759 B2 | 11/2012 | Jacobson et al. | |
| 8,390,545 B2 | 3/2013 | Van Den Biggelaar et al. | |
| 8,659,587 B2 | 2/2014 | Slack et al. | |
| 8,994,705 B2 | 3/2015 | Jacobson et al. | |
| 9,064,463 B2 | 6/2015 | Jung et al. | |

(Continued)

FOREIGN PATENT DOCUMENTS

| | | |
|---|---|---|
| WO | 2008059038 A1 | 5/2008 |
| WO | 2010012831 A1 | 2/2010 |

*Primary Examiner* — Xuemei Zheng
(74) *Attorney, Agent, or Firm* — EIP US LLP

(57) ABSTRACT

An apparatus comprising an electrowetting display element comprising a radiation filter, a first support plate, a second support plate, a first fluid and a second fluid immiscible with the first fluid. The apparatus comprises at least one processor and at least one memory comprising computer program instructions operable to, with the at least one processor: determine, based on an input signal indicative of a characteristic of an input to the apparatus, that a predetermined condition for reduction of an exposure of the first fluid to incident light is satisfied; and, in response, generate an output signal to control the electrowetting display element to configure the first fluid in a retracted configuration with the first fluid at least partly overlapped by the radiation filter and with both the first fluid and the second fluid in contact with a surface of the first support plate.

21 Claims, 7 Drawing Sheets

(56) References Cited

U.S. PATENT DOCUMENTS

| | | |
|---|---|---|
| 9,508,308 B1 | 11/2016 | Novoselov et al. |
| 2006/0110580 A1 | 5/2006 | Aylward et al. |
| 2008/0224970 A1 | 9/2008 | Van Den Biggelaar |
| 2009/0046082 A1* | 2/2009 | Jacobson .............. G02B 26/005 345/204 |
| 2011/0187696 A1* | 8/2011 | Slack ................... G09G 3/3433 345/211 |
| 2011/0226998 A1 | 9/2011 | Van De Weijer-Wagemans et al. |
| 2013/0044045 A1 | 2/2013 | Jacobson et al. |
| 2013/0257914 A1 | 10/2013 | Jung et al. |
| 2013/0271357 A1 | 10/2013 | Wang |
| 2014/0009814 A1 | 1/2014 | Gibson et al. |
| 2014/0333899 A1 | 11/2014 | Smithwick |

\* cited by examiner

A method of controlling a matrix of m columns and n rows of electrowetting display elements, including selectively transmitting:
A first row voltage signal, using a first row driving system, to a switchable element associated with each of the electrowetting display elements of a selected row of the n rows of the electrowetting display elements; and a second row voltage signal, using a second row driving system, to a switchable element associated with each of the electrowetting display elements of a plurality of rows of the n rows of electrowetting display elements

FIG. 5a

A method of controlling a matrix of m columns and n rows of electrowetting display elements, including:
Switching a respective first fluid and a respective second fluid of each electrowetting display element of a plurality of rows of the n rows of electrowetting display elements to a retracted configuration of the respective first fluid, with at least part of the respective first fluid overlapped by a respective radiation filter of the respective electrowetting display element

FIG. 5b

ELECTROWETTING DISPLAY ELEMENT WITH RADIATION FILTER

CROSS-REFERENCE TO RELATED APPLICATIONS

This is a continuation of U.S. patent application Ser. No. 14/582,308, filed on Dec. 24, 2014, the entire contents of which are incorporated herein by reference.

BACKGROUND

Display devices with a matrix of electrowetting display elements are known to be controlled using the active matrix driving technique. This involves for example addressing rows of display elements consecutively, to apply a voltage for setting a desired fluid configuration of each display element of the row being addressed.

Active matrix driving is an efficient technique for driving a matrix of numerous display elements. However, for some driving requirements, it can be considered a complex driving technique.

It is desirable to devise an improved system for driving electrowetting display elements.

BRIEF DESCRIPTION OF DRAWINGS

FIGS. 5A and 5B are flow diagrams of examples of a method of controlling a matrix of electrowetting display elements;

DETAILED DESCRIPTION

Figure 1:
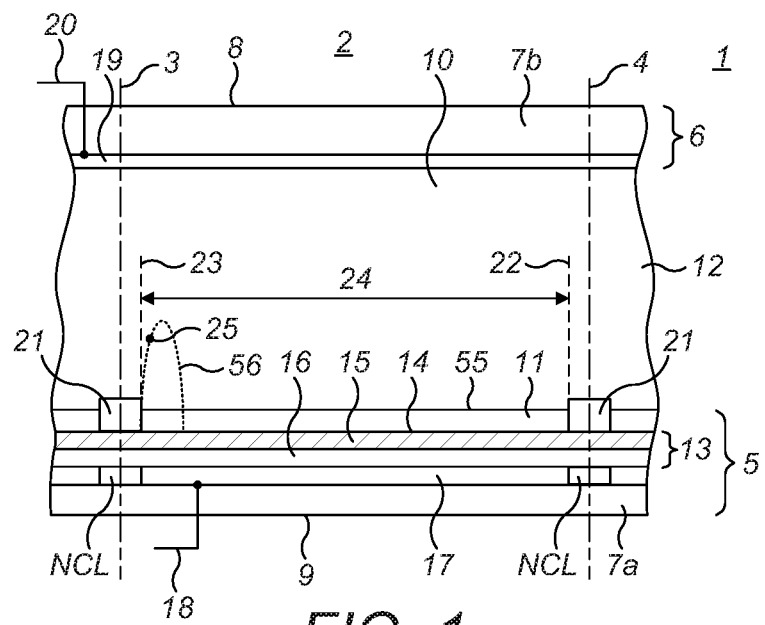
FIG. 1 shows schematically an example display element.

FIG. 1 shows a diagrammatic cross-section of part of an example of an electrowetting display device 1, including a plurality of picture elements or display elements 2, one of which is shown in the Figure and which may also be referred to as an electrowetting cell. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 7a, 7b and may be rigid or flexible. The support plates in some examples include further layers and/or structures than illustrated, for example circuitry for controlling the display elements. Such features are not illustrated, for clarity.

The display device has a viewing side 8 on which an image or display formed by the display device can be viewed and a rear side 9. In the Figure a surface of the first support plate 5, which surface is in this example a surface of the substrate 7a, defines the rear side 9; a surface of the second support plate 6, which surface is in this example a surface of the substrate 7b, defines the viewing side; alternatively, in other examples, a surface of the first support plate may define the viewing side. The display device may be of the reflective, transmissive or transflective type. The display device may be an active matrix driven display device. The plurality of display elements may be monochrome. For a colour display device the display elements may be divided in groups, each group having a different colour; alternatively, an individual display element may be able to show different colours.

A space 10 of each display element between the support plates is filled with two fluids: a first fluid 11 and a second fluid 12 at least one of which may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is at least one of electrically conductive or polar and may be water, or a salt solution such as a solution of potassium chloride in water. The second fluid may be transparent; it may instead be coloured, white, absorbing or reflecting. The first fluid is electrically non-conductive and may for instance be an alkane like hexadecane or may be an oil such as silicone oil.

"Electrically conductive" for example means that the second fluid is capable of conducting electricity; for example an electrical current may flow through the second fluid due to the flow of ions or electrons through the second fluid. "Polar" in examples means that the second fluid comprises at least one compound (for example a liquid vehicle) having a molecule with a net dipole; i.e. that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bond in the molecule, with for example one of the atoms being a heteroatom such as oxygen or nitrogen. For example, such a polar atom to atom bond is a bond between an oxygen (O) atom and a hydrogen (H) atom, i.e. an —O—H bond, which may be in some examples due to the presence of at least one hydroxyl (—OH) group. The presence of such bonds may cause hydrogen bonding between different molecules within the second fluid.

The first fluid may absorb at least a part of the optical spectrum. The first fluid may be transmissive for a part of the optical spectrum, forming a colour filter. For this purpose the first fluid may be coloured by addition of pigment particles or a dye. Alternatively, the first fluid may be black, for example absorb substantially all parts of the optical spectrum, or reflecting. A reflective first fluid may reflect the entire visible spectrum, making the layer appear white, or part of it, making it have a colour.

The support plate 5 includes an insulating layer 13. The insulating layer may be transparent or reflective. The insulating layer 13 may extend between walls of a display element. To avoid short circuits between the second fluid 12 and electrodes arranged under the insulating layer, layers of the insulating layer may extend uninterrupted over a plurality of display elements 2, as shown in the Figure. The insulating layer has a surface 14 facing the space 10 of the display element 2. In this example the surface 14 is hydrophobic. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 1 and may be formed of Teflon® AF1600. The barrier layer 16 may have a thickness, taken in a direction perpendicular the plane of the substrate, between 50 nanometers and 500 nanometers and may be made of an inorganic material like silicon oxide or silicon nitride.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each display element 2 includes a first electrode 17 as part of the support plate 5. In examples shown there is one such electrode 17 per element. The electrode 17 is electrically insulated from the first and second fluids by the insulating layer 13; electrodes of neighboring display elements are separated by a non-conducting layer NCL. In some examples, further layers may be arranged between the insulating layer 13 and the electrode 17. The electrode 17 can be of any desired shape or form. The electrode 17 of a display element is supplied with voltage signals by a signal line 18, schematically indicated in the Figure.

The support plate 6 includes a second electrode 19, which may extend between walls of a display element or extend uninterruptedly over a plurality of display elements 2, as shown in the Figure. The electrode 19 is in electrical contact with the conductive second fluid 12 and is common to all display elements. The electrode may be made of for example the transparent conductive material indium tin oxide (ITO). A second signal line 20 is connected to the electrode 19. Alternatively, the electrode may be arranged at a border of the support plates, where it is in electrical contact with the second fluid. This electrode may be common to all elements, when they are fluidly interconnected by and share the second fluid, uninterrupted by walls. The display element 2 can be controlled by a voltage V applied between the signal lines 18 and 20. The signal line 18 can be coupled to a matrix of control lines on the substrate 7a. The signal line 20 is coupled to a display driving system.

The first fluid 11 in this example is confined to one display element by walls 21 that follow the cross-section of the display element. The cross-section of a display element may have any shape; when the display elements are arranged in a matrix form, the cross-section is usually square or rectangular. Although the walls are shown as structures protruding from the insulating layer 13, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The extent of the display element, indicated by the dashed lines 3 and 4, is defined by the center of the walls 21. The area of the surface 14 between the walls of a display element, indicated by the dashed lines 22 and 23, is called the display area 24, over which a display effect occurs. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied to the electrodes of the display element. The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

Figure 2:
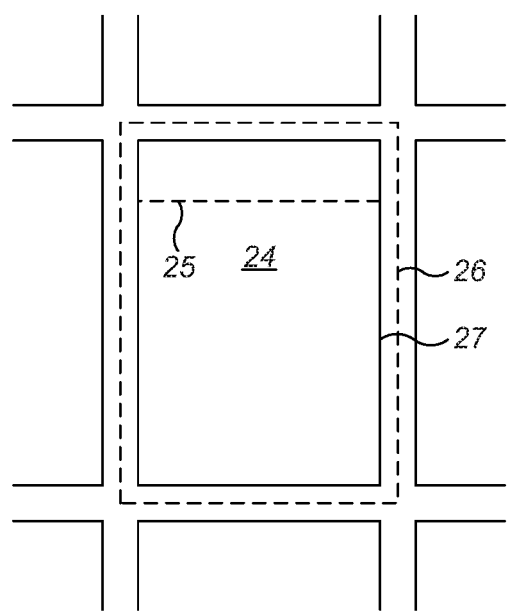
FIG. 2 shows a plan view of the example display element.

FIG. 2 shows a matrix of rectangular picture elements in a plan view of the hydrophobic surface 14 of the first support plate. The extent of the central picture element in FIG. 2, corresponding to the dashed lines 3 and 4 in FIG. 1, is indicated by the dashed line 26. Line 27 indicates the inner border of a wall; the line is also the edge of the display area 24.

When a zero or substantially zero voltage is applied between the electrodes 17 and 19, for example when the electrowetting element is in an off state, the first fluid 11 forms a layer between the walls 21, as shown in the FIG. 1. Application of a voltage will retract the first fluid to a retracted configuration, for example any configuration of the first fluid where the second fluid adjoins part of the display area, for example a retracted configuration with the first fluid contracted against a wall as shown by the dashed shape 25 in FIG. 1 or FIG. 2. A retracted configuration of the first fluid may for example be with the second fluid adjoining 50% or more than 50% of the display area. In other examples a retracted configuration of the first fluid is such that at least 50%, at least 60%, at least 70%, at least 80%, at least 90%, at least 95%, at least 98%, approximately 100% or 100% of the first fluid is overlapped by a radiation filter such as that described in examples herein. The controllable shape of the first fluid, in dependence on the magnitude of applied voltage, is used to operate the picture element as a light valve, providing a display effect over the display area 24. For example, switching the fluids to increase adjoinment of the second fluid with the display area may increase the brightness of the display effect provided by the element.

This display effect determines the display state an observer will see when looking towards the viewing side of the display device. The display state can be from black to white with any intermediate grey state; in a colour display device, the display state may also include colour.

Figure 3:
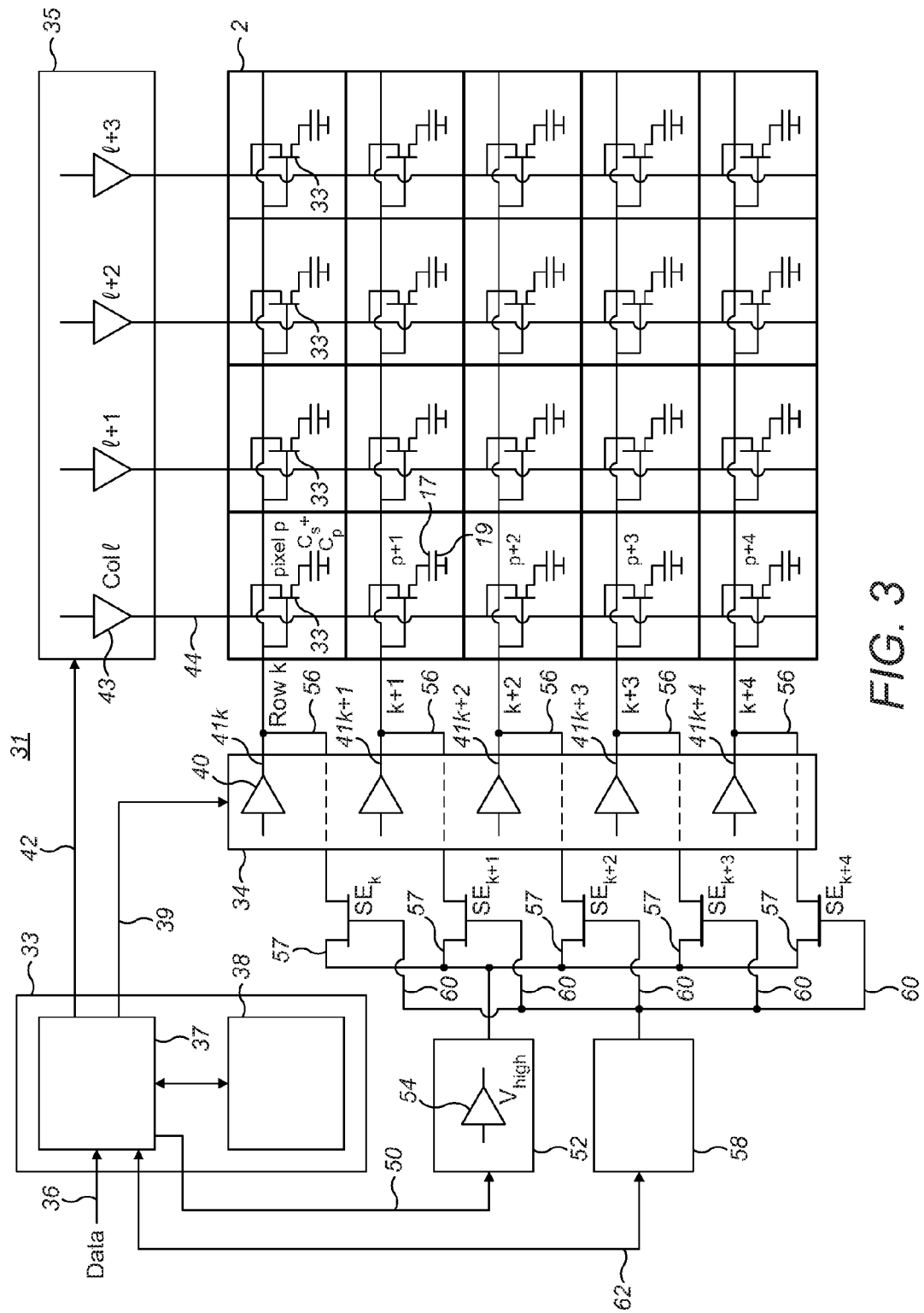
FIG. 3 shows schematically an example of circuitry for driving a matrix of display elements.

FIG. 3 shows schematically features of an example of an electrowetting display apparatus 31. In this example of a so-called active matrix drive type the display apparatus includes a display driving system and the display device 2. The display driving system includes a display controller or controller 33, a display row driver 34 and a display column driver 35. Data indicative of display states of the display elements, the display states for example representing at least part of a still image or video image, is received via an input line 36 to the display driving system. The display controller includes a processor 37 for processing the data entered via the input line 36. The processor is connected to at least one memory 38. The display controller prepares the data for use in the display device.

The at least one memory may store computer program instructions that are configured to cause the display apparatus to perform one or more of the methods of controlling a display device as described herein when being executed by the processor. The computer program instructions may be stored on a computer program product including a non-transitory computer-readable storage medium.

An output of the processor 37 is connected by line 39 to the display row driver 34, which includes row driver stages 40 that transform signals to the appropriate voltages for the display device 2. The driver stages 40 therefore are an example of first row voltage signal generators. Row signal lines 41 connect the row driver stages to respective rows of the display device 32 for transmitting the voltage pulses generated in the display row driver to display elements in each row of the display device, thereby providing a row addressing signal to each row of the display device. In other words, one or more voltage pulses for addressing one or more rows is transmitted over the row signal lines 41 corresponding to the rows to switchable elements corresponding, for example associated, respectively to the display elements in the one or more rows. The display row driver 34 generates the voltage pulses used for addressing the rows of the display device, using information from the processor 37 to set a value of the pulse duration of the voltage pulses.

Another output of the processor 37 is connected by line 42 to the display column driver 35, which includes column driver stages 43 that transform signals to the appropriate voltages for the display device 32. Column signal lines 44 connect the column driver stages to the columns of the display device 32, providing a column signal to each column of the display device.

The display controller 33 determines which rows are selected for addressing and in which order. The selected rows may for example be consecutively addressed by applying an addressing signal, in the form of at least one voltage pulse, to each of these rows. In alternative examples, other addressing sequences are envisaged, for example a random row addressing sequence. In examples where the display elements of a row are connected to the same row signal line, addressing a row means addressing each display element of that row. When a display element is being addressed, the display element receives the column signal that is applied to the column signal line to which the display element is connected. The column signal for a display element is applied substantially simultaneously with the voltage pulse used for addressing the display element. Substantially simultaneously means for example that the column signal is present on the column signal line for at least the duration of the voltage pulse.

The display drivers may comprise a distributor, not shown in FIG. 3, for distributing data input to the display driver over a plurality of outputs connected to the driver stages. The distributor may be a shift register, which may be considered a memory. FIG. 3 shows the signal lines only for those columns and rows of the display device that are shown in the Figure. The row drivers may be integrated in a single integrated circuit. Similarly, the column drivers may be integrated in a single integrated circuit. The integrated circuit may include the complete driver assembly. The integrated circuit may be integrated on the support plate 5 or 6 of the display device. The integrated circuit may include the entire display driving system. Such an arrangement may be known as a "chip on glass" (COG) construction. In other examples a "chip on foil" (COF) construction may be used, where the column and/or row divers may be integrated on a foil rather than on the support plate 5 or 6, which foil is connectable to circuit lines of the support plate for driving the picture elements.

The display device 32 comprises a plurality of display elements arranged in a matrix of n rows, where n may be ≥2, for example larger than one, with m columns, where m may be ≥2. The total number of display elements in this example is n×m. FIG. 3 shows display elements for five rows, labelled k to k+4 and four columns labelled 1 to 1+3. The total number of rows and columns for common display devices may range between a few hundred and a few thousand. The display elements, also called pixels, of column 1 are labelled p to p+4. Each display element may have the same construction as the display element 2 in FIG. 1. In other examples a display element may represent a sub-pixel.

FIG. 3 shows electrical elements of the display elements. Each display element of the display device 32 includes an active element in the form of one or more switchable elements. The switchable element may be a transistor, for example a thin-film transistor (TFT) 33, or a diode. The display elements are indicated each with a pixel capacitor Cp formed by electrodes 17 and 19. A line connecting the electrode 19 of the capacitor to ground is the common signal line 20 and the line connecting the electrode 17 of the capacitor to the drain terminal of the transistor is the signal line 18 shown in FIG. 1. The display element may include a capacitor Cs for storage purposes or for making the duration of the holding state longer or the voltage applied to the element uniform across the display device. This capacitor is arranged in parallel with Cp and is not separately shown in FIG. 3. The column drivers provide the signal levels corresponding to the input data for the display elements. The row drivers provide the signals for addressing the row of which the elements are to be set in a specific display state. In examples, addressing a row means applying a signal on the signal line of the row that switches a transistor of each of the display elements of the row to a conducting state of the transistor. Each row of the n rows of the display device is addressable by a signal such as a voltage pulse; the voltage pulse is applied to a switchable element of each of the display elements in the addressed row for switching the switchable element.

The addressing of rows is part of the addressing of display elements in an active matrix display device. A specific display element is addressed by: applying a voltage pulse to the row in which the specific display element is located, thereby driving the row and in particular examples a switchable element such as a transistor of each of the display elements in the row to a conducting state; and in coordination with this driving the row, applying a voltage to the column in which the specific display element is located, thereby driving the column and the specific display element by applying the voltage to the specific display element. The terms driver and driving element are used herein in examples to describe an electronic circuit or component for providing an appropriate signal such as a voltage level or voltage pulse for driving a display element, row and/or column.

When the transistor of a display element receives at its gate a voltage pulse of its row addressing signal, the transistor becomes conducting and it passes the signal level of its column driver to the electrode 17 of the electrowetting cell. In examples, a voltage pulse is a rapid, transient change in the voltage from a baseline value, for example a low voltage level, to a greater or smaller magnitude, for example a high voltage level higher in magnitude than the low voltage level, followed by a rapid return, for example change, to the baseline value. The time period between the two subsequent voltage changes of the voltage pulse is called a pulse duration. After the transistor has been switched off, so the transistor is no longer conducting, the voltage over the cell will be substantially maintained until the transistor is switched on again by the next row addressing signal for the display element. The time during which the transistor is switched off is called the holding state of the element. In this active matrix driving method the electrodes of the electrowetting cells are connected to the driving stages briefly at the start of a period during which they show a certain display effect. During this connection, a voltage related to the desired display effect is applied to the electrodes. After the display element is disconnected from the driver stage, the voltage on the electrodes is substantially maintained by one or more capacitors during the period during which the display element shows the display effect. The method is called 'active', because the display element contains at least one active element, for example a transistor.

In examples described herein, for example that described using FIG. 3, a system comprises a matrix of m columns and n rows of electrowetting display elements, such as those display elements described using FIGS. 1 and 3. Such a system further comprises a column driving system configured to transmit a column voltage signal to the electrode of each of the electrowetting display elements of at least one selected row of the n rows to be driven; such a column driving system is for example as described using FIG. 3 which comprises the display column driver 35, including the column driving stages 43. Such a system further comprises a first row driving system configured to transmit a first row voltage signal, for example a voltage pulse as described below, to the switchable element associated with each respective one of the electrowetting display elements of the selected row of the n rows; such a first row driving system is for example as described using FIG. 3 which comprises the display row driver 34, including the row driver stages 40.

In examples described herein, such a system further comprises a second row driving system which is configured to transmit a second row voltage signal, for example a voltage pulse as described below, to the switchable element associated with each respective one of the electrowetting display elements of a plurality of rows of the n rows of electrowetting display elements. Further details of an example of such a second row driving system will now be described using FIG. 3. It is to be noted that whereas in examples the first row driving system is for driving individual rows of the n rows, by selecting one row at a time for driving, the second row driving system is configured for driving a plurality of rows for example simultaneously, for example substantially simultaneously within acceptable timing tolerances. In this way, multiple rows of electrowetting display elements can be driven together by the second row driving system. The plurality in some examples, such as that of FIG. 3, comprises the n rows and therefore for example the second driving system may be configured to drive the n rows of the electrowetting display elements simultaneously. Therefore, all rows may be driven substantially simultaneously.

In examples, for example that of FIG. 3, an output of the processor 37 is connected by line 50 to a further display row driver 52 which includes a row driver stage 54 that for example, similar to the row driver stage 40, transforms signals to an appropriate voltage for the display device. In this example the row driver stage 54 outputs a voltage Vhigh corresponding to a high voltage level of a voltage pulse for transmitting to each switchable element such as the TFT 33 associated respectively with each electrowetting display element of the plurality of rows of the n rows.

In examples such as that of FIG. 3, an output of the row driver stage 54 is connected by lines 57 for connecting the Vhigh voltage signal to the lines 41 connecting the display row driver of the first row driving system to a respective row of switchable elements associated with the electrowetting display elements of the respective row. In the example of FIG. 3 the second row driving system is connected by the lines 57 to the switchable elements associated with the electrowetting display elements of each row of the plurality of the n rows. Therefore, in examples where the plurality of the n rows comprises all n rows, the output of the further display row driver 52 is connected to each switchable element associated respectively with an electrowetting display element of all n rows, for example via lines 41.

In examples, the second row driving system comprises at least one switchable element SE configured to selectively control transmission of the voltage pulse to the switchable elements associated with each respective one of the electrowetting display elements of the plurality of rows of the n rows of electrowetting display elements. The at least one switchable element may be a plurality of switchable elements, for example a TFT or diode similar to those described previously, with one such switchable element being connected with a source terminal of the switchable element to the output of the further display row driver and a drain terminal of the switchable element connected to the switchable elements associated with the electrowetting display elements. Thus, in examples, each of a plurality of such switchable elements is associated with a respective one row of the n rows and is configured to selectively control transmission of the voltage pulse to the switchable elements associated with each respective one of the plurality of switchable elements of the respective one row. In this way, by selectively switching the switchable elements of the second row driving system, the voltage pulse of the second row driving system can be selectively applied to the switchable elements associated with the electrowetting display elements. In the example of FIG. 3, the at least one switchable element of the second row driving system is a plurality of TFTs SE each connected by their source and drain terminals in a respective one of the lines 57 connecting the further display row driver output to the switchable elements associated with the electrowetting display elements. The gates of each TFT SE is connected to a respective line 60. FIG. 3 illustrates such a TFT for each row with the label SE and the corresponding row label. For example, the TFT for row k+1 is labelled SE k+1. The In examples, each switching element of the second row driving system, for example TFTs SE k to SE k+4, is controllable by selectively applying a control signal, for example a voltage pulse as described in examples, to the gate terminal of each switching element. In dependence of this applied voltage pulse, the switchable elements such as the TFTs of FIG. 3 can be switched to be conducting or not, therefore either permitting transmission of a voltage signal from the output of the further display row driver 52, via an input and output of the switchable element, to the switchable elements associated with the electrowetting display elements, or not permitting such transmission.

In examples, for controlling the switching of the switching elements such as TFTs SE k to SE k+4, the second row driving system is configured to transmit a voltage pulse to each of the plurality of switchable elements associated respectively with a row of the n rows of electrowetting display elements, for selectively controlling transmission of a voltage pulse to each of the plurality of switchable elements associated with a respective one of the electrowetting display elements. In some such examples, for example as now described in relation to FIG. 3, the second row driving system has a controller 58 connected by lines 60 to each switchable element SE k to SE k+4, specifically to the gate terminal of each TFT of the second row driving system. The controller 58 is connected to an output of the processor 37 by a line 62. The processor 37 can therefore coordinate using the first and second row driving systems in dependence on the required driving of the electrowetting display elements.

The at least one memory and computer program instructions are therefore configured to, with the at least one processor, in examples selectively switch operation of the system between a first operation mode using the first row driving system for controlling the transmitting by the column driving system of the column voltage signal to the electrode of each electrowetting display elements of at least one selected row of the n rows, and a second operation mode using the second row driving system for controlling the transmitting by the column driving system of the column voltage signal to the electrode of each electrowetting display element of the plurality of rows of the n rows, for example all of the n rows. For example, the first operation mode may be used when active matrix type driving is required, for example when each or many of the electrowetting display elements are required to be switched to a different display state. The second operation mode may instead be used when the electrowetting display elements of all of the rows of the plurality of n rows, for example all n rows, are required to be switched to the same display state.

Examples of operation of the system will now be described. One such example is now given using FIG. 4 in relation to the example of FIG. 3.

Figure 4:
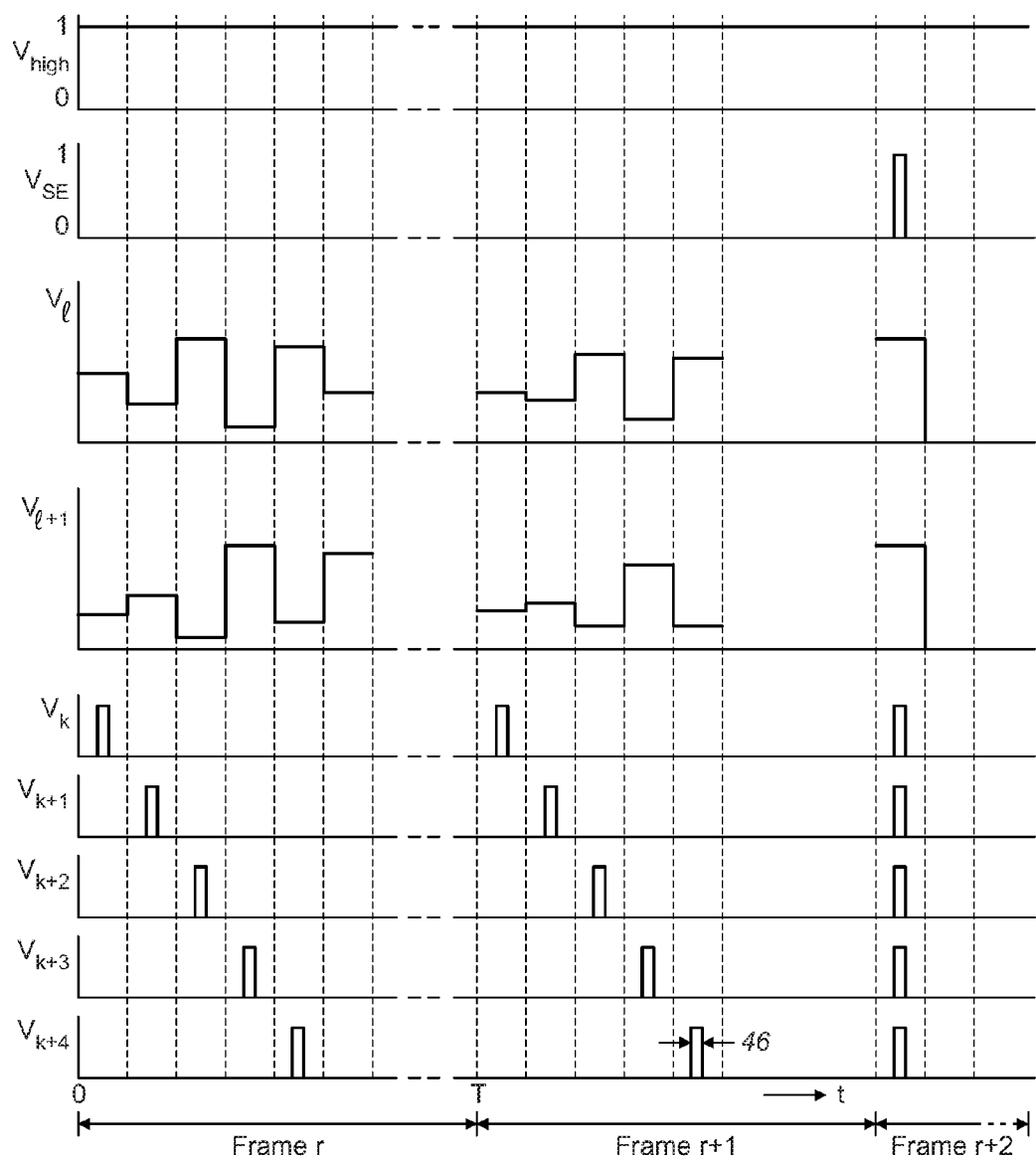
FIG. 4 shows schematically a driving method example.

FIG. 4 shows a diagram of an example method of driving the display elements. The method displays images during a series of frames, for example, an image is displayed within the duration of one frame. During a frame all display elements of a display device may be addressed; in a matrix all rows of the matrix of a display device are addressed during a frame. FIG. 4 shows two column signals V1 and V1+1 and five row addressing signals Vk . . . Vk+4 of the first row driving system as a function of time t for two consecutive frames r and r+1. Frames r and r+1 correspond to operating using the first row driving system and frame r+2 corresponds with operating using the second row driving system. Additional signals Vhigh and VSE are illustrated too, which correspond respectively with the output of the further display row driver 52 and the output of the controller 58 of the second row driving system. It is noted that "1" on the Vhigh axis does not represent a voltage of 1 volts but instead represents a high voltage level and that "0" on the Vhigh axis in the present examples represents a low voltage level. The duration of a frame or frame period is Tf. In examples, a frame period Tf is a pre-determined period for addressing the n rows of the matrix. In some examples the frame period is the period between consecutive addressing of the same row. The duration of the period may be fixed, for example programmed, in the controller 33. In other examples a frame period may be controlled to be different from frame to frame, depending for example on the content being displayed, for example whether rapid changes to the display effect are required, or not.

When row k is selected and addressed by a pulse on the row addressing signal Vk, as shown at the start of frame r in FIG. 4, the transistor in each display element of row k becomes conducting and the voltages on each of the column signal lines 44 will be put on the electrode 17 of each display element in row k. Subsequently, the display column driver 35 of FIG. 3 changes the voltages on the column signal lines to the values required for row k+1. When row k+1 is selected by a pulse on row addressing signal k+1, the voltages are put on the electrode 17 of FIG. 1 of the display elements of row k+1. All n rows of the display device will in this example be selected consecutively in a similar manner in frame r. The process of selecting the rows starts again in the following frame r+1.

In common display apparatuses the pulse duration of the voltage pulse of the row addressing signal, also called the gate period Tg or gate time, is such that the n rows of the display device can be addressed for example consecutively within one frame period. Common display apparatuses have therefore usually a pulse duration equal to or less than Tf/n. For example, addressing 1000 rows in a frame period of 20 milliseconds requires a pulse duration of 20 microseconds or less.

During frames r and r+1 the switchable elements SE k to SE k+4 are not conducting, with the controller 58 not transmitting a voltage pulse to the switchable elements, as indicated by the plot of $VS_E$. Therefore, although in some examples the Vhigh output is not zero, but instead corresponds to the voltage level of a voltage pulse for switching the switchable elements SE k to SE k+4, it is not transmitted to the switchable elements associated with the display elements as the switchable elements SE k to SE k+4 of the second row driving system are not switched to be conducting.

For frame r+2 the first row driving system is not used for selecting which rows of electrowetting display elements are connected to the column driving system. Instead the second row driving system is used. In this example, it is desired to switch all of the electrowetting display elements to a display state with the first fluid retracted to a retracted configuration, for example to the brightest display state which the controller is configured to switch the display elements to. The position of the first fluid for each display element may therefore be switched to that illustrated in FIG. 1 using dashed line 25.

Thus, in the example of FIG. 4, to switch the first fluid of each display element to the same configuration, for example the fully retracted configuration the controller is configured to drive the first fluid to, a voltage is applied by each column driving stage corresponding to the desired display state. The controller 58 of the second row driving system outputs a voltage pulse to each of the switchable elements SE k to SE k+4 for switching them to a conducting state. Thus, whilst these switchable elements are switched to a conducting state, they allow the voltage signal from the further display row driver 52 to be transmitted to the switchable elements 33 associated respectively with the electrowetting display elements of the plurality of rows, in this case all n rows. The duration of the voltage pulse, as shown in FIG. 4 in the plot of $V_{SE}$ corresponds with the duration of the voltage pulse transmitted to the switchable elements associated with the display elements, as illustrated in plots of Vk to V k+4. Thus, in this way, the further row driver 52 in combination with the switchable elements SE k to SE k+4 and the controller 58 can be considered in this example to operate together as a second row voltage signal generator, for example a second row voltage pulse generator, with the duration of the voltage pulse from the controller 58 determining the duration of the voltage pulse transmitted to the switchable elements associated with the electrowetting display elements.

With each of the switchable elements associated with the display elements receiving the voltage pulse from the second row driving system, for example simultaneously, the electrode of each display element of a column of the matrix is connected to the voltage level of the corresponding column driving stage. Therefore, with each column driving stage set to output the maximum voltage level for example, all display elements can be switched to a desired display state corresponding with the maximum voltage level. Where this display state corresponds with a white display effect of the display elements, for example in a matrix of red green and blue (RGB) display elements and with each display element driven to its brightest state, then all display elements may be simultaneously driven so the overall display effect is white. In other examples, depending on the display effect of individual display elements, a different colour or display effect may be given with the display element driven to its brightest state.

Once all display elements of all rows, or the display elements of whichever plurality of rows is driven by the second driving system, have been driven to the required display state, the second row driving system need not immediately transmit a further voltage pulse to the switchable elements associated with the display elements of the appropriate rows. This is illustrated in FIG. 4 by the zero voltage level for all voltages except for Vhigh. The capacitance of the display elements holds the configuration of the fluids and therefore the display state for a period of time. However, to avoid deterioration of the display effect over time, it may be necessary for the second row driving system to drive the rows again to re-apply the required column voltage level to the display element electrodes.

It will be appreciated that it is possible to use the first row driving system to switch multiple or all of the electrowetting display elements to the same display state. However, as this operates on active matrix driving principles, each row driver stage is used which requires greater power demands as each row driver stage is addressed individually with a controlling signal from the controller. Using a different row driving system, such as the second row driving system described herein, which uses a single driver stage, different from a driver stage of the first row driving system, is considerably more power efficient. Furthermore, although it is envisaged in further examples that one of the driver stages of the first row driving system could be used and connected for driving each of the electrowetting display elements of a plurality or all of the n rows, the use of a separate dedicated driving stage in the second row driving system allows a more appropriately specified electrical component to be selected, and hence more design freedom, rather than needing to identify a component for the first row driving system which needs to fulfill the needs of driving one row of display elements and all rows of the display elements for the second mode of operation. Such a dedicated driving stage may therefore be more power efficient given its selection for the specific requirements.

In further examples, it is envisaged that instead of the plurality of switchable elements SE illustrated in FIG. 3, one such switchable element SE may be used to control transmission of a voltage signal from the further row driver stage 54 to the switchable elements associated with the plurality of display elements. In such an example, an output of the further row driver stage 54 may be connected to the source terminal of the one switchable element SE and the drain terminal may be connected via multiple lines respectively to the row lines 41k to 41k+4. The controller 58 in such an example would therefore be connected to the gate terminal of the one switchable element SE.

Although some examples of circuitry implementations are given, it is to be appreciated that the functionality of the first and second row driving systems may be implemented in further circuitry implementations not described herein but readily understood by the skilled person.

Examples will now be described where the second mode of operation may be used. FIGS. 5A and 5B relate to examples of such examples.

Figure 6:
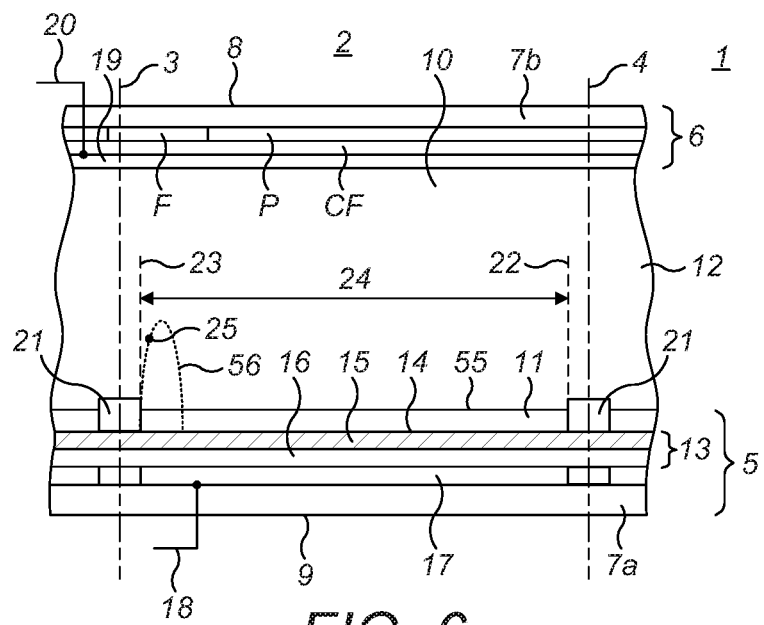
FIGS. 6 and 7 show schematically an example display element.
Figure 7:
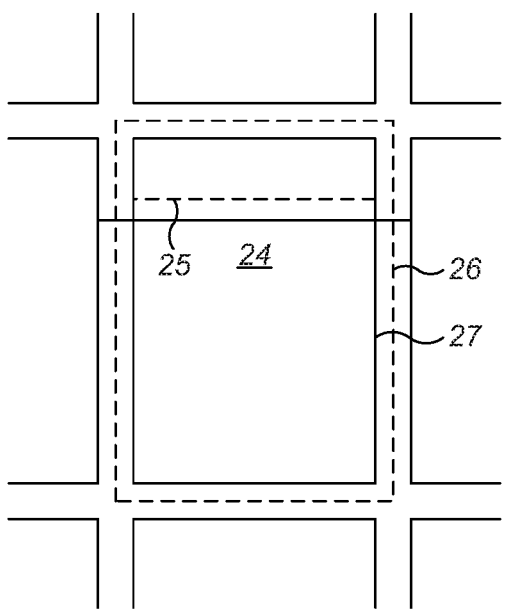

First examples of using the second mode of operation are described with reference to FIGS. 6 and 7. FIGS. 6 and 7 show an example of a display element similar to that shown in FIGS. 1 and 2; the same reference numerals are used to label the same features. Corresponding descriptions for such features should be taken to apply also.

The second support plate 6 in the example of FIG. 6 comprises at least one layer. The at least one layer includes for example a colour filter CF, for example as a layer, and a layer comprising a radiation filter F, described in more detail below, and for example a planarisation layer P for filling the layer adjacent to the radiation filter F. The colour filter CF absorbs at least one wavelength of light, for example in the visible spectrum, thus filtering the light passing through the colour filter to provide a coloured display state; this may be the case in examples where the first fluid is black. The colour filter may be formed of a material having a colour filtering property, or may comprise a layer of a material transmissive for substantially all, for example 90% or more, wavelengths of light, in for example the visible spectrum, with a coating to act as the colour filter. The colour filter CF in the example of FIG. 6 is positioned between the radiation filter F and the space 10 and for example covers substantially all of the display area. In other examples, the colour filter CF may lie on top of the radiation filter F, such that the radiation filter F is between the colour filter CF and the space 10. Further examples include a single filter element which performs the function of the colour filter and the radiation filter and thus is a combined colour and radiation filter; such examples may comprise a region which acts as the colour filter but not the radiation filter and a different region which acts as the radiation filter but not the colour filter; in other examples a single filter element may have a region which performs the function of both the colour filter and the radiation filter, which may in some further examples be in addition to separate colour filtering and radiation filtering regions. The second support plate 6 in other examples does not include a colour filter, for example in cases where the first fluid 11 is appropriately coloured, for example due to the addition of a dye or pigment, for providing the colour of a display state.

In some examples, for example that being described using FIGS. 6 and 7, at least one of the first fluid 11 or the second fluid 12 are susceptible to deterioration by exposure to radiation of at least one predetermined wavelength. Deterioration may be any type of physical or chemical degradation, disintegration or decomposition of the first fluid and/or the second fluid, for example of a component of the first and/or second fluid. Exposure to radiation in examples refers to the radiation being incident on the first and/or second fluid, for example such that the first and/or second fluid are irradiated by the radiation. At least one of the first fluid or the second fluid may be susceptible to exposure to radiation over a sustained or long period of time, for example over a period of operation of the display device of a day or more, either over one continuous period of time or over a plurality of periods of time with a total duration of a day or more. Alternatively, the at least one of the first fluid or the second fluid may be susceptible to exposure to short bursts of radiation, for example an hour or less.

In examples, at least one of the first fluid or the second fluid comprises an additive which is susceptible to deterioration by exposure to the radiation of the at least one predetermined wavelength. The additive may be or comprise a fluid and/or solid particles, for example. The deterioration may be one or more of: a decomposition of the additive, or, with the additive being a colourant, such as a dye or a pigment as explained above, a change of colour of the colourant for example due to a decomposition of the chemical structure of the colourant. Such a change of colour may be a decolouring, for example a bleaching, for example due to a photobleaching reaction on exposure to radiation. In examples, the decolouring may result in the colourant changing to a different colour from its original colour. A change of colour of the colourant in examples reduces the amount of the colourant having the original, for example desired, colour. In such examples, the amount or concentration of the colourant with the original colour is reduced compared with an initial amount or concentration of colourant, resulting in decolouring.

In the example of FIG. 6, the second support plate 6 comprises a layer comprising a radiation filter F, for example a radiation filter layer, configured to filter input radiation, for example at least some, for example at least a portion of the, radiation of the at least one predetermined wavelength for which the at least one of the first fluid or the second fluid are susceptible to deterioration. For example, the radiation filter F in examples selectively blocks radiation of the at least one predetermined wavelength, for example by absorbing or reflecting the radiation, such that radiation of the at least one predetermined wavelength is not transmitted through the radiation filter. In examples, some or all radiation with a wavelength which is not one of the at least one predetermined wavelengths is transmitted or at least partly transmitted through the radiation filter. The radiation filter is for example a layer which may have a substantially uniform thickness ("substantially" means for example within acceptable manufacturing tolerance). As the skilled person will readily appreciate, the radiation filter in examples is formed of or comprises a suitable material or compound for filtering the at least one predetermined wavelength, for example including a dye or a pigment or an organic material; the specific material will depend on the specific wavelength or range of wavelengths to be at least partially filtered. The radiation filter in examples is formed of a non-fluid material, for example a solid plastic material which may be flexible or rigid. This non-fluid material may have been formed by applying and then hardening or solidifying a fluid material.

In examples, the at least one predetermined wavelength the at least one of the first fluid or the second fluid are susceptible to deterioration by is one or more of the following wavelengths: at least one wavelength in the range of about 100 to about 380 nanometers, at least one wavelength in the range of about 380 to about 700 nanometers or at least one wavelength in the range of about 700 nanometers to about 1000 nanometers. The term "about" includes a degree of variation, therefore the at least one wavelength may be within the range of wavelengths within acceptable measurement uncertainties, for example within 10% of the upper or lower bound of the range of wavelengths. In an example, the at least one predetermined wavelength is one or more of: at least one wavelength in the ultraviolet range of the electromagnetic spectrum, for example within the range of 100 to 380 nanometers, at least one wavelength in the visible range of the electromagnetic spectrum, for example within the range of 380 to 700 nanometers, or at least one wavelength in the infrared range of the electromagnetic spectrum, for example within the range of 700 to 1000 nanometers. In an example, the radiation filter F filters radiation of a plurality of wavelengths, for example a plurality of wavelengths within one or more of the ultraviolet, visible or infrared ranges of the electromagnetic spectrum. In further examples, the radiation filter F filters ultraviolet and visible radiation, ultraviolet and infrared radiation, visible and infrared radiation or ultraviolet, visible and infrared radiation.

As the radiation filter F is positioned between the viewing side 8 of the display device 1 and the first 11 and second 12 fluids, the radiation filter F therefore prevents or reduces incident radiation of the at least one predetermined wavelength, for example ambient radiation which is incident on the second support plate 6 from the viewing side 8 of the display device 1, from being transmitted from the side of the radiation filter F on which the radiation is incident, for example the side of the radiation filter F closest to the viewing side 8, to the other, for example opposite, side of the radiation filter F, for example the side of the radiation filter F closest to the second fluid 12. This prevents the parts of the first 11 and second 12 fluids which are beneath, for example covered by, the radiation filter F from being exposed, or for example irradiated, by the radiation of the at least one predetermined wavelength. The parts of the first 11 and second 12 fluids which are protected from the radiation by the radiation filter F in this way are therefore not deteriorated, or have a reduced deterioration, by exposure to the radiation whilst beneath the radiation filter. This improves the lifetime of the display device 1 by increasing the useful lifetime of one or both of the first and second fluids.

To prolong the lifetime of one or both of the first and second fluids, it is therefore desirable to switch the configuration of the first and second fluids so that for example, whenever possible, as much of the fluid which is susceptible to deterioration is configured to be covered by the radiation filter F. For example, if the first fluid is susceptible to deterioration, then wherever possible it is desirable to switch the first and second fluids to a configuration with the first fluid configured with the form indicated with label 25, so the radiation filter F covers the first fluid. During operation of the display device when showing content, for example text or a movie, configuring the first fluid with the form as shown with label 25 may not be possible. However, during for example a period of inactivity of the display device, or for example if incident light on the display element is detected as being harmful to the lifetime of the first fluid, the display element, for example a plurality or all of the display elements of the display device may be switched to a configuration of the first and second fluids with the first fluid being at least partly, for example substantially entirely, or for example entirely, covered by the radiation filter F.

To switch a plurality of the display elements, for example a plurality of the n rows, for example all n rows of the display elements to this fluid configuration, it is more power efficient to use the second mode of operation for driving the rows than the first mode of operation.

Therefore, for example, the at least one memory and the computer program instructions are configured to, with the at least one processor, measure a period of inactivity of the electrowetting display elements. For example, a period of inactivity may be identified if no input from a user to the device is received within a given timeframe, for example a given duration of for example 30 minutes. Upon identifying such a period of inactivity, the at least one memory and the computer program instructions are configured to, with the at least one processor, switch operation of the system from the first operation mode to a second operation mode. Then, once in the second operation mode, the display elements of a plurality of the n rows, for example all of the n rows, may be driven to configure the first and second fluids so the first fluid is configured to be covered at least partly, for example substantially entirely as shown by label 25, by the radiation filter F, thus protecting the first fluid from incident light which may deteriorate the first fluid. The display elements remain in this fluid configuration for a period of time after the voltage has been removed from the display element due to the capacitance of the display element. However, to maintain the configuration of the first and second fluids with the first fluid configuration shown with label 25, in some examples a further voltage is applied to each of the plurality of the n rows of display elements, for example all n rows, periodically using the second row driving system. Driving the plurality of the n rows, for example all of the n rows, for this purpose of protecting the first fluid against deterioration, using the second operation mode has less power requirements than using the first operation mode.

In some examples, in addition to, or alternative to, the measuring a period of inactivity as explained above, the system may include a light sensor which for example detects an intensity of light incident on the sensor and/or a particular wavelength or range of wavelengths. The light sensor is in examples positioned such that the detected light intensity and/or wavelength(s) is indicative of light incident on the display elements and for example the first and second fluids. In examples, if a detected light intensity is measured as being above a predetermined light intensity threshold and/or of a predetermined wavelength or range of wavelengths, the at least one memory and the computer program instructions may, with the at least one processor, in dependence on a signal from the light sensor which signal is for example indicative of the exceeding of the predetermined light intensity threshold and/or the predetermined wavelength or range of wavelengths, switch the electrowetting display device to the second mode of operation and for example drive the plurality, for example all, of the n rows of display elements to the fluid configuration shown in FIG. 6, so that in this example the first fluid is covered by the radiation filter F to prolong its lifetime.

In other examples, the second mode of operation may be used where the display device is to display an image where many of the n rows of display elements are to have the same configuration of first and second fluids. For example, the at least one memory and the computer program instructions may be configured to, with the at least one processor, process input image data to identify where the display effect of a plurality of the n rows of display elements is to be the same. This may for example be the case where text is being displayed by the display device; rows of display elements which are to provide a display effect for providing for example a space, for example a white space, between textual characters, for example lines of text, being displayed by different rows of display elements, may all be driven together, using the second mode of operation, to provide the white display effect. In a further example, before displaying a new page of text to a user, the second operation mode may be used to drive a plurality, for example all, of the n rows of display elements to provide a display effect to temporarily blank the image displayed by the device, for example to a white page display effect, before then driving the appropriate display elements to display the text of the next page of text content to be displayed by the device. Using the second mode of operation to drive the plurality of n rows is more power efficient than the first mode of operation which required individually driving each of the row drivers of the first row driving system using the active matrix technique.

Further examples are envisaged where the second operation mode is useful, as the skilled person will readily appreciate.

Figure 8:
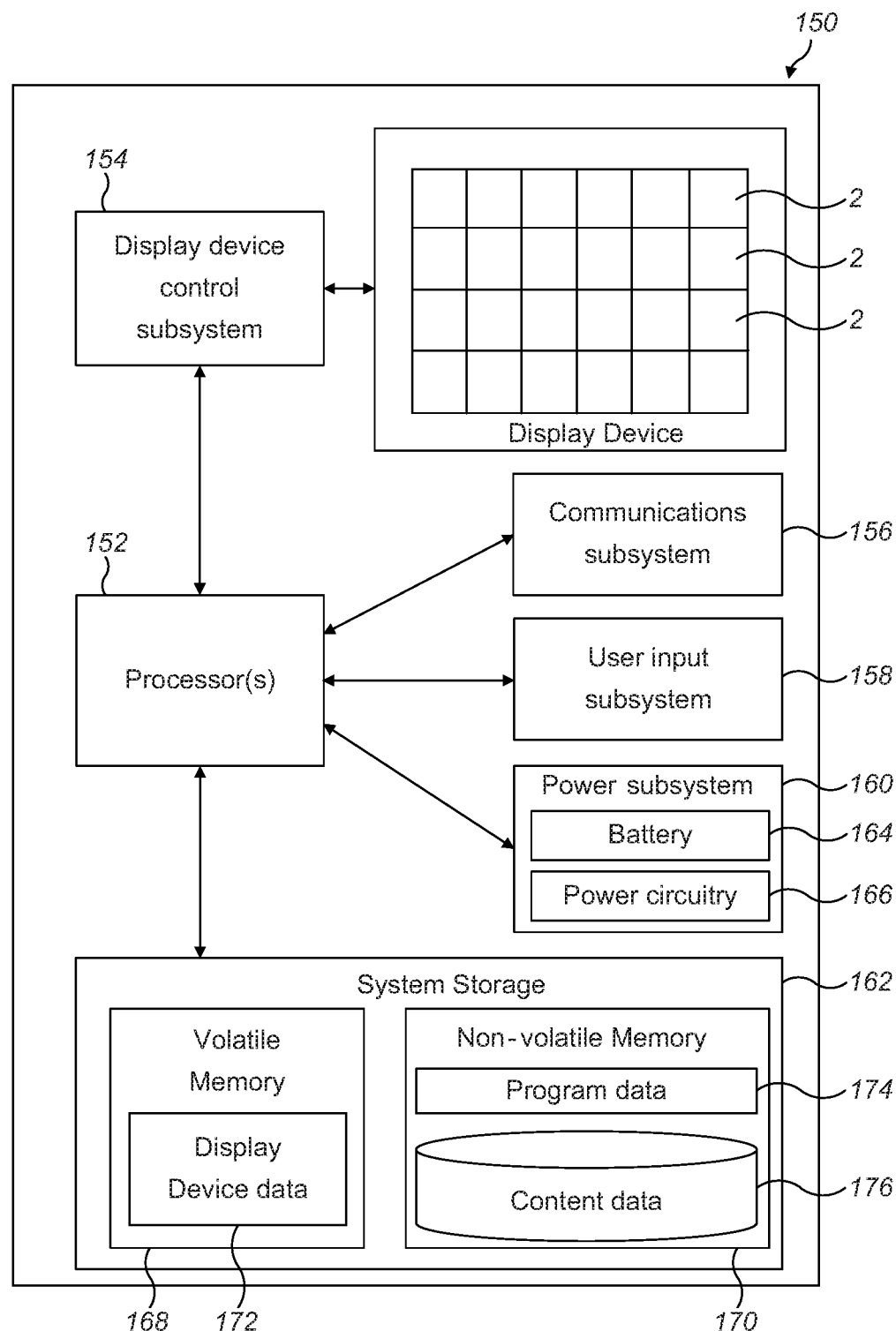
FIG. 8 shows schematically an example of a system.

FIG. 8 shows schematically a system diagram of an example system, for example apparatus 150, comprising an electrowetting display device such as any of the examples described above, for example the electrowetting display device described above comprising electrowetting display elements 2. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 150. The apparatus includes at least one processor 152 connected to and therefore in data communication with for example: a display device control subsystem 154, a communications subsystem 156, a user input subsystem 158, a power subsystem 160 and system storage 162. The display device control subsystem 154 is connected to and is therefore in data communication with the display device. The at least one processor 152 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 162. The at least one processor may additionally, or in the alternative, contain memory, such as processor registers.

The display device control subsystem 154 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 156 for example is configured for the apparatus to communicate with for example a computing device via a data network, for example a computer network such as the Internet, a local area network, a wide area network, a telecommunications network, a wired network, a wireless network, or some other type of network. The communications subsystem 156 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 158 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 160 for example includes power circuitry 166 for use in transferring and controlling power consumed by the apparatus. The power may be provided by a mains electricity supply or from a battery 164, via the power circuitry. The power circuitry may further be used for charging the battery from a mains electricity supply.

The system storage 162 includes at least one memory, for example at least one of volatile memory 168 and non-volatile memory 170 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect provided by the electrowetting display device.

In the example of FIG. 8, the volatile memory 168 stores for example display device data 172 which is indicative of display effects to be provided by the display device. The processor 152 may transmit data, based on the display device data, to the display device control subsystem 154 which in turn outputs signals to the display device for applying voltages to the display elements, for providing display effects from the display device. The non-volatile memory 170 stores for example program data 174 and/or content data 176. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

Figure 9:
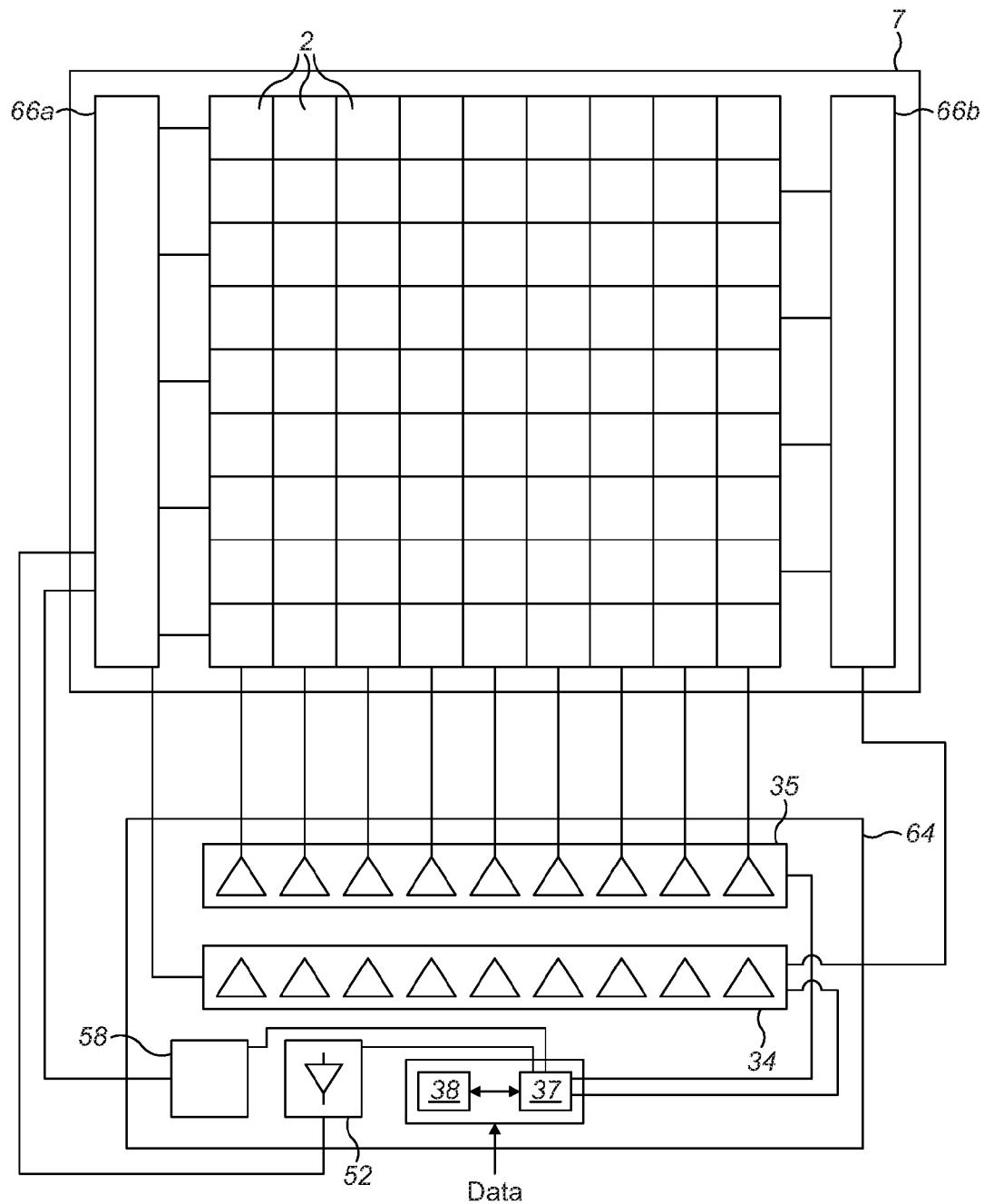
FIG. 9 shows schematically an example circuitry arrangement.

FIG. 9 shows schematically features of an example of an implementation of the first and second row driving systems. Features described previously are labelled with the same reference numerals and corresponding descriptions should be taken to apply here also. In this example, on a surface of the substrate 7 of the first support plate which surrounds the display elements 2, circuitry for the second row driving system is mounted. This circuitry for example includes circuit lines and the switchable elements of the second row driving system. The circuitry may be divided into two parts, labelled in FIG. 9 as 66*a* and 66*b*, with one part 66*a* connected to the switchable elements associated with display elements of odd numbered rows and the other part 66*b* connected to the switchable elements associated with display elements of even numbered rows. This circuitry and the electrodes of the display elements are connected to the appropriate drivers and other circuitry such as the processor 37 which are mounted on a separate substrate 64 from the substrate 7. This example allows the second row driving system to be implemented in a compact manner. In other examples, at least some of the circuitry mounted on the separate substrate 64 shown in FIG. 9 is instead mounted on the substrate 7, for a more integral circuitry implementation.

The above examples are to be understood as illustrative examples. Further examples are envisaged. For example, in examples above the labels row and column have been used to refer to lines of display elements with a particular orientation; it is envisaged that in further examples features described above in relation to a row may instead relate to a column and features described above in relation to a column may instead relate to a row. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An apparatus comprising:
a light sensor configured to generate an input signal indicative of a characteristic of an input to the apparatus, wherein the characteristic is a characteristic of light detected by the light sensor;
an electrowetting display element comprising:
a radiation filter;
a first support plate;
a second support plate;
a first fluid; and
a second fluid immiscible with the first fluid, the first fluid and the second fluid located between the first support plate and the second support plate;
at least one processor; and
at least one memory comprising computer program instructions operable to, with the at least one processor:
receive the input signal from the light sensor;
determine, based on the input signal, that a predetermined condition for reduction of an exposure of the first fluid to incident light is satisfied; and, in response,
generate an output signal to control the electrowetting display element to configure the first fluid in a retracted configuration with the first fluid at least partly overlapped by the radiation filter and with both the first fluid and the second fluid in contact with a surface of the first support plate.

2. The apparatus according to claim 1, comprising:
a matrix of m columns and n rows of electrowetting display elements, wherein m and n are integers and the electrowetting display element is located in a first column of the m columns and in a first row of the n rows;
column driving circuitry; and
row driving circuitry,
wherein the output signal comprises a column voltage signal and a row voltage signal and the computer program instructions are operable to, with the at least one processor, and in response to the predetermined condition for reduction of the exposure of the first fluid to the incident light being satisfied:
transmit the column voltage signal to the first column using the column driving circuitry; and
transmit the row voltage signal to the first row using the row driving circuitry,
to control the electrowetting display element to configure the first fluid in the retracted configuration.

3. The apparatus according to claim 2, wherein the electrowetting display element comprises:
a first electrode located in the first support plate;
a second electrode in contact with the second fluid, the second fluid being at least one of: electrically conductive or polar; and
a switchable element,
wherein the column driving circuitry is configured to transmit the column voltage signal to the first electrode, the column voltage signal having a first magnitude for configuration of the first fluid in the retracted configuration, and
the row driving circuitry is configured to transmit the row voltage signal to the switchable element, the row voltage signal having a second magnitude for switching the switchable element to a conductive state.

4. The apparatus according to claim 1, wherein the light sensor is located relative to the electrowetting display element to receive ambient light indicative of a characteristic of light incident on the electrowetting display element.

5. The apparatus according to claim 1, wherein:
the characteristic is an intensity of the light;
the predetermined condition is a predetermined intensity condition; and
the computer program instructions are operable to, with the at least one processor, process the input signal to determine that a magnitude of the intensity of the light satisfies the predetermined intensity condition; or
the characteristic is a wavelength of the light;
the predetermined condition is a predetermined wavelength condition; and
the computer program instructions are operable to, with the at least one processor, process the input signal to determine that a wavelength of the light satisfies the predetermined wavelength condition.

6. The apparatus according to claim 5, wherein:
to determine that the magnitude of the intensity of the light satisfies the predetermined intensity condition, the computer program instructions are operable to, with the at least one processor, determine, based on the input signal, that the magnitude of the intensity equals or exceeds a predetermined intensity threshold; or
to determine that the wavelength of the light satisfies the predetermined wavelength condition, the computer program instructions are operable to, with the at least one processor, determine, based on the input signal, that the wavelength is:
a predetermined wavelength; or
within a predetermined range of wavelengths.

7. The apparatus according to claim 6, wherein the predetermined range of wavelengths is at least one of: about 100 nanometers to about 380 nanometers; an ultraviolet range of an electromagnetic spectrum; about 380 nanometers to about 700 nanometers; a visible range of the electromagnetic spectrum; about 700 nanometers to about 1000 nanometers; or an infrared range of the electromagnetic spectrum.

8. The apparatus according to claim 1, wherein the radiation filter is configured to at least partly filter, from input radiation, radiation of at least one predetermined wavelength which at least one of the first fluid or the second fluid is susceptible to deterioration from.

9. The apparatus according to claim 1, wherein the radiation filter is at least one of: a non-fluid radiation filter, a substantially solid radiation filter, or a substantially solid plastic radiation filter.

10. The apparatus according to claim 1, wherein the radiation filter is positioned between a viewing side of the electrowetting display element and at least one of the first fluid or the second fluid.

11. The apparatus according to claim 1, wherein, with the first fluid in the retracted configuration, the first fluid is substantially entirely overlapped by the radiation filter.

12. The apparatus according to claim 1, wherein one of the first support plate or the second support plate comprises a layer comprising a first region comprising the radiation filter and a second region free from the radiation filter,
wherein, with the first fluid in the retracted configuration, the second region substantially non-overlaps the first fluid.

13. The apparatus according to claim 1, comprising a plurality of the electrowetting display element,
wherein the computer program instructions are operable to, with the at least one processor:

configure the first fluid of each of the plurality of the electrowetting display element in the retracted configuration, on the basis that the predetermined condition is satisfied.

14. The apparatus according to claim 1, wherein the computer program instructions are operable to, with the at least one processor, switch the first fluid from a non-retracted configuration, with the second fluid not in contact with the surface of the first support plate, to the retracted configuration,
wherein a larger part of the first fluid is overlapped by the radiation filter with the first fluid in the retracted configuration than with the first fluid in the non-retracted configuration.

15. A method of controlling an electrowetting display element, the method comprising:
determining that a predetermined condition for reduction of an exposure of a first fluid of the electrowetting display element to incident light is satisfied, the electrowetting display element comprising a second fluid immiscible with the first fluid, the first fluid and the second fluid located between a first support plate of the electrowetting display element and a second support plate of the electrowetting display element; and, in response,
configuring the first fluid in a retracted configuration with the first fluid at least partly overlapped by a radiation filter of the electrowetting display element and with both the first fluid and the second fluid in contact with a surface of the first support plate,
wherein the method comprises at least one of:
detecting an intensity of light using a light sensor, wherein the determining that the predetermined condition is satisfied comprises determining that a magnitude of the intensity of the light satisfies a predetermined intensity condition;
detecting a wavelength of light using a light sensor, wherein the determining that the predetermined condition is satisfied comprises determining that the wavelength of the light satisfies a predetermined wavelength condition; or
measuring a measured duration of a period of inactivity of the electrowetting display element, wherein the determining that the predetermined condition is satisfied comprises determining that the measured duration of the period of inactivity of the electrowetting display element satisfies a predetermined duration condition.

16. The method according to claim 15, wherein the radiation filter is configured to at least partly filter, from input radiation, radiation of at least one predetermined wavelength which at least one of the first fluid or the second fluid is susceptible to deterioration from.

17. The method according to claim 15, comprising configuring the first fluid of each of a plurality of the electrowetting display element in the retracted configuration, on the basis that the predetermined condition is satisfied.

18. An apparatus comprising:
an electrowetting display element comprising:
a radiation filter;
a first support plate;
a second support plate;
a first fluid; and
a second fluid immiscible with the first fluid, the first fluid and the second fluid located between the first support plate and the second support plate;
at least one processor; and
at least one memory comprising computer program instructions operable to, with the at least one processor:
determine, based on an input signal indicative of a measured duration of a period of inactivity of the electrowetting display element, that a predetermined condition for reduction of an exposure of the first fluid to incident light is satisfied; and, in response,
generate an output signal to control the electrowetting display element to configure the first fluid in a retracted configuration with the first fluid at least partly overlapped by the radiation filter and with both the first fluid and the second fluid in contact with a surface of the first support plate.

19. The apparatus according to claim 18, wherein the computer program instructions are operable to, with the at least one processor, determine that the measured duration of the period of inactivity of the electrowetting display element equals or exceeds a predetermined duration.

20. The apparatus according to claim 18, wherein the computer program instructions are operable to, with the at least one processor, generate the input signal,
the input signal indicative of a measured duration of a period within which no data indicative of a display state for display by the electrowetting display element is received by the at least one processor.

21. The apparatus according to claim 18, wherein the radiation filter is configured to at least partly filter, from input radiation, radiation of at least one predetermined wavelength which at least one of the first fluid or the second fluid is susceptible to deterioration from.

* * * * *